United States Patent

Kondo et al.

[11] Patent Number: 5,861,713
[45] Date of Patent: Jan. 19, 1999

[54] LOW VOLTAGE ELECTRON BEAM DISPLAY APPARATUS HAVING BRIGHTNESS INCREASED BY REDUCING AN OXIDE INEVITABLY FORMED ON A SURFACE OF AN OXISULFIDE PHOSPHOR ON MANUFACTURE

[75] Inventors: Yojiro Kondo; Toshihiko Ayusawa, both of Tokyo; Hidehito Mori, Kagoshima; Osamu Yamasita, Kagoshima; Kazuo Kaneko, Kagoshima; Masayuki Usui, Kagoshima; Yosinori Hirai, Shiga; Masato Hayashi, Shiga; Yasuhiro Mano, Shiga; Masaki Mori, Tokushima; Kenichi Ishidate, Tokushima; Katsunori Uchimura, Tokushima, all of Japan

[73] Assignees: NEC Corporation, Tokyo; Nichia Chemical Industries, LTD., Tokushima, both of Japan

[21] Appl. No.: 883,105

[22] Filed: Jun. 26, 1997

[30] Foreign Application Priority Data

Jun. 26, 1996 [JP] Japan ..................... 8-165542

[51] Int. Cl.⁶ ..................... H01J 29/10
[52] U.S. Cl. ............... 313/495; 313/496; 313/467
[58] Field of Search .................. 313/495, 496, 313/497, 486, 463, 467, 468

[56] References Cited

U.S. PATENT DOCUMENTS 3,941,714  3/1976  Mathers et al. .

FOREIGN PATENT DOCUMENTS 3931691  4/1991  Germany .
52-3912  6/1977  Japan .

(List continued on next page.)

OTHER PUBLICATIONS

Patent Abstracts of Japan, vol. 002, No. 089 (C–018), Jul. 21, 1978.

Keikotai Dogakkai, "Phosphor Handbook", 1987, published by Ohm Corporation (discussed in the specification beginning at p. 4, line 23).

"Electroceramics", vol. 24, No. 122, 1993, published by Gakukensha (discussed in the specification beginning at p. 6, line 11).

(List continued on next page.)

*Primary Examiner*—Vip Patel
*Attorney, Agent, or Firm*—Sughrue, Mion, Zinn, Macpeak & Seas, PLLC

[57] ABSTRACT

On manufacturing a low voltage electron beam excitation phosphor display apparatus (10) which includes an anode (6) having a principal surface and enclosed in a vacuum chamber (1, 2, and 3), a phosphor film (7) formed on the principal surface, and a cathode (9) enclosed in the vacuum chamber opposite to the phosphor film, a phosphor is prepared which consists essentially of an oxisulfide and an oxide which is inevitably formed on a surface of the oxisulfide on preparing the phosphor. The oxisulfide is represented by $Ln_2O_2S:R$, where Ln is at least one selected from a group consisting of Gd, La, Y, and Lu and where R is a rare-earth element. The oxide is removed from the phosphor to produce an oxide-removed phosphor. A pasts comprising a mixture of the oxide-removed phosphor, a conductive material, and an autolytic type binder is coated on the principal surface of the anode which is formed on an insulating substrate (1) constituting the vacuum chamber. The binder of the paste is heated in a nonoxidizing atmosphere to form, on the principal surface of the anode, the phosphor film which has the oxide-removed phosphor and the conductive material. The anode and the cathode are enclosed in the vacuum chamber to obtain a manufactured low voltage electron beam excitation phosphor display apparatus. The oxide may be $Ln_2O_3$ into which a component $Ln_2O_2S$ of the oxisulfide is changed.

16 Claims, 4 Drawing Sheets

FOREIGN PATENT DOCUMENTS

| | | |
|---|---|---|
| 55-152782 | 11/1980 | Japan . |
| 57-55172 | 11/1982 | Japan . |
| 62-33266 | 7/1987 | Japan . |
| 1104684 | 4/1989 | Japan . |
| 158618 | 12/1989 | Japan . |
| 333185 | 2/1991 | Japan . |
| 335086 | 2/1991 | Japan . |
| 39580 | 2/1991 | Japan . |
| 4106848 | 4/1992 | Japan . |
| 6168683 | 6/1994 | Japan . |
| 7310073 | 11/1995 | Japan . |
| 7310074 | 11/1995 | Japan . |

OTHER PUBLICATIONS

Takao Kishino "Vacuum Fluorescent Display", Sangyo Tosho, published in 1990 (discussed in the specification beginning at p. 6, line 13).

Nikkei Electronics, Jan. 29, 1996, pp. 85–102 (discussed in the specification beginning at p. 6, line 14).

M. Urayama et al. "International Electron Devices Meeting", Technical Digest, p. 16–17–1, 1995 (discussed in the specification beginning at p. 6, line 16).

LOW VOLTAGE ELECTRON BEAM DISPLAY APPARATUS HAVING BRIGHTNESS INCREASED BY REDUCING AN OXIDE INEVITABLY FORMED ON A SURFACE OF AN OXISULFIDE PHOSPHOR ON MANUFACTURE

BACKGROUND OF THE INVENTION

This invention relates to a low voltage electron beam excitation phosphor display apparatus and to a method of manufacturing the same.

A low voltage electron beam excitation phosphor display apparatus of the type described, comprises a single electron gun or a plurality of electron guns of a hot-cathode or a cold-cathode type arranged within the apparatus kept at a vacuum. Each electron gun (or a cathode) is for emitting a low voltage electron beam with an accelerating voltage of about 500V or less to irradiate each phosphor film (formed on each anode by mixing and heating a phosphor and a conductive material) so that the phosphor film performs high-luminance light emission to provide monochromatic or multi-color (several colors to full color) display of characters, designs, and moving pictures with an excellent balance in brightness.

In recent years, practical use has been made of various display apparatuses for displaying a condition of a device or information by means of a video image of characters, designs, and moving pictures. For example, there are widely known a cathode ray tube (CRT) extensively used as a television including a high definition television (HDTV) or as a display terminal of a personal computer, a liquid crystal display (LCD) used in a notebook-type personal computer or the like, a fluorescent indicator panel (FIP) used in a device such as a domestic (or home) video tape recorder and an on-vehicle meter to display the condition of the device or an automobile, and a plasma display panel (PDP) recently developed into a color display as a wall-hanging television. In recent years, a field emission display (FED) is proposed as a novel display apparatus and is being actively developed for practical use.

The above-mentioned display apparatuses are advantageous in that the condition and the information varying from time to time can be visually displayed and transmitted immediately under electrical control, and find a more and more increasing demand as transmitting means in the information society. The CRT has wide spread from an early time as an excellent display apparatus for a television and a personal computer and is still extensively used at present.

In the meanwhile, the CRT requires a depth corresponding to the size of a display screen. As the display screen becomes larger, the depth increases. This results in an increase in installation area and weight. In addition, the larger screen decreases the brightness of the display screen. In order to avoid the above-mentioned problems, there arises a demand for various display apparatuses in place of the CRT which requires a higher voltage and a greater electric power and lacks portability. Such demand is particularly noticeable in recent years. As such display apparatuses, so-called flat panel displays, such as the LCD, the FIP, the PDP, and the FED, capable of providing display with a small depth have been proposed and put into practical use (or involved in the process of development), as well known in the art.

Among the above-mentioned known display apparatuses, description of the prior art will hereafter be made restrictedly about those display apparatuses (CRT, FIP, FED) in which the phosphor is irradiated by the electron beam to be excited for light emission.

The CRT has a structure comprising an electron gun, a phosphor film containing a phosphor, a shadow mask arranged in an inside space kept at a vacuum. The electron gun produces an electron beam (high voltage electron beam) accelerated with a high voltage not lower than 1 kV to irradiate the phosphor so that the phosphor is made to emit light. In a color display CRT, the phosphor film has a structure such that three kinds of phosphors having emission colors corresponding to three primary colors (R, G, B) are applied in a fine stripe or dot pattern onto a panel portion to serve as a display screen. By means of the shadow mask and a deflection yoke arranged inside the apparatus, the high voltage electron beam is electrically deflected in irradiation direction to irradiate a desired part of the phosphor film so that light emission in R (red), G (green), and B (blue) is effected. The brightness (luminance) of the light emission is changed in R, G, and B by controlling the beam intensity of the electron beam to provide color mixtures as full-color display. As well known, the CRT is practically used in a television, an HDTV, and the like.

Currently, the CRT is extensively used because the ratio of display quality to the cost (namely, cost effect) is high. For example, high-brightness (for example, on the order of 300 cd (candela)/$m^2$ or more) display is possible. Color reproducibility is excellent. Even after the use for a long time (for example, twenty or thirty thousand hours or more), brightness balance is not disturbed and color offset is suppressed. As also well known, in the past technical development leading to an excellent display quality which the CRT has at present, development of a high-brightness emission phosphor and development and improvement of a manufacturing process have taken a great role. This is described in detail, for example, in Reference (1) ("Phosphor Handbook", edited by Keikotai Dogakkai and published by Ohm Corporation, 1987). The above-mentioned reference describes the following. For a certain period of time in the past, (Zn,Cd)S has been used as a matrix composition for a green or a red phosphor. As a result of a number of trials in development of phosphors, an improved phosphor containing no cadmium but having at least an equivalent emission characteristic has been developed and used up to now. For the CRT, use is currently made of, for example, ZnS:Ag (representing the phosphor having a matrix composition of ZnS with Ag added as an activating agent for obtaining a desired emission color: similar representation will be used in the following) as a blue-emitting phosphor, ZnS:Au,Cu,Al or ZnS:Cu,Al as a green-emitting phosphor, and $Y_2O_2S$:Eu as a red-emitting phosphor.

Although the CRT has widely been put into practical use, it has a heavy weight and therefore lacks portability as described above. Furthermore, use of the fast electron beam requires a high voltage which in turn requires electrical parts having a high breakdown characteristic. This makes it difficult to reduce the size and weight. Thus, various problems are revealed. In order to solve the above-mentioned problems, the FIP is put into practical use. On the other hand, the FED is being developed. In the following, the prior art will be described.

Each of the FIP and the FED is an electron beam excitation phosphor display apparatus which is a so-called flat panel display having a small depth and which does not require a high voltage. Because the irradiation direction of the electron beam is not deflected, a beam deflection space along the depth is no longer required so that a thin structure can be achieved. By development and improvement of a phosphor and a phosphor film capable of performing high-brightness emission even with an electron beam produced at a low accelerating voltage and having small energy as compared with the electron beam in the CRT, it is possible to obtain a small-sized and light-weight display apparatus because an electric design for a high breakdown voltage is unnecessary. This is well known and described, for example, in Reference (1) mentioned above, Reference (2) ("Electroceramics", Vol. 24, No. 122, 1993: published by Gakukensha), Reference (3) (Takao Kishino "Vacuum Fluorescent Display", Sangyo Tosho, published in 1990), Reference (4) (Nikkei Electronics, Jan. 29, 1996, pp. 85–102), and Reference (5) (M. Urayama et al "International Electron Devices Meeting, Technical Digest, p. 16-7-1, 1995).

A light-emission display mechanism of the FIP or the FED will be briefly described. Within the display apparatus kept at a vacuum so as to allow the flight of the electron beam, a cathode (electron gun) and an anode are arranged. An electric voltage (accelerating voltage) is applied between the electron gun and the anode so that the electron beam emitted from the electron gun (of a hot-cathode type or a cold-cathode type) is made to hit or impinge upon the anode. The phosphor film is adhered to the surface of the anode. The electron beam flying towards the anode impinges upon the phosphor film so that the phosphor film is excited to emit light. The flight of the electron beam is locally controlled so that a desired part of the phosphor film alone is controllably made to emit light. Thus, characters and designs are displayed by means of light emission. The phosphor film and the anode are adhered to each other so as to be electrically conductive. As well known, adhesion is carried out by heat treatment at 400°–500° C. in a manufacturing process of the display apparatus.

A low voltage electron beam excitation phosphor display apparatus having an external appearance as the flat panel display is extensively put into practical use as the FIP. Specifically, the FIP provides light-emission display in response to the low voltage electron beam accelerated at a low voltage on the order of several tens of volts (in other words, having small energy) and is widely put into practical use as a character and design display apparatus, for example, as a display apparatus incorporated into electric products for domestic (or home) use such as a video tape recorder or as a display apparatus in a speedometer of an automobile. In addition, research and development are energetically carried out at present for the purpose of practization of the FED as a display apparatus for displaying a fine image comparable to that of the television. In fact, however, the prior art relating to the low voltage electron beam excitation phosphor display apparatus has the following problems (1) and (2) inherent to low voltage electron beam excitation as described also in the above-mentioned references.

(1) An irradiation electron beam has small energy because it is the low voltage electron beam. The penetration depth of the electron beam into the phosphor is restricted to the extreme vicinity of the surface of the phosphor. Although depending upon the accelerating voltage, the penetration depth is at most about 10 nm. Light emission can be caused from a restricted region corresponding to the penetration depth. Therefore, the total quantity of the activating agent contained in the phosphor can not be completely excited for light emission. Thus, high-brightness light emission is inherently difficult to obtain.

(2) The lower the accelerating voltage of the irradiation electron beam is, the easier the phosphor is electrically charged (negative). Even if the irradiation electron beam is increased in quantity for the purpose of providing the high-brightness light emission, the irradiation electron beam is subjected to repulsive force by the phosphor electrically charged negative and can not reach the phosphor. As a result, high brightness can not be achieved although the electron beam is increased in quantity.

Because of occurrence of the above-mentioned phenomenon inherent to the low voltage electron beam, it is difficult to obtain the high-brightness light emission by the use of the low voltage electron beam. In view of the above, various developments and improvements described in the following are energetically carried out at present in connection with not only the phosphor and the method of producing the same but also the method of manufacturing the display apparatus as the FIP and the FED.

Consideration will be made about the phosphor. Those phosphors put into practical use for the low voltage electron beam are restricted. For example, the above-mentioned References (2) and (3) describe that the phosphors ZnO:Zn, ZnS:Cl, ZnS:Au,Al, (Zn,Cd)S:Ag,Cl are put into practical use for green emission, blue emission, greenish-yellow emission, red-based emission, respectively.

Specifically speaking about the red-based phosphor, the red emission has much demand because it is highly visible and excellent as a display color. The phosphor (Zn,Cd)S:Ag, Cl is extensively put into practical use because the high-brightness light emission is possible. As described in Japanese Unexamined Patent Publication (JP-A) No. 104684/1989 (phosphor composition), improvement such as stabilization of the brightness is being made. However, the above-mentioned phosphor comprises cadmium which is specified as a harmful substance. As well known, there is a demand for a red phosphor containing no cadmium but performing high-brightness light emission of a comparable level. If the above-mentioned phosphor $Y_2O_2S:Eu$ currently widely used in the CRT with the fast electron beam is used with the low voltage electron beam as the red phosphor containing no cadmium, the brightness sufficient in practical use can not be obtained. Under the circumstances, the phosphor containing cadmium has been practically used. This is well known as described in the above-mentioned references. However, development of the phosphor containing no cadmium is still continued. Disclosure is made of a composition ($Y_2O_2S:Eu.aY_2O_3$: $1\times10^{-4} \leq a \leq 2\times10^{-3}$) which comprises $Y_2O_2S:Eu$ and oxide ($Y_2O_3$) in a specific concentration range and which performs high-brightness light emission (Japanese Unexamined Patent Publication (JP-A) No. 310073/1995: red-emitting composition), or a composition which is obtained by partially substituting an element La for an element Y as one of main components of $Y_2O_2S:Eu$ and which performs high-brightness light emission (Japanese Unexamined Patent Publication (JP-A) No. 310074/1995: red-emitting composition).

In addition to the development and the improvement of the phosphor adapted for the low voltage electron beam, a conductive material is added and mixed in order to suppress the electric charge of the phosphor which is the problem inherent to the low voltage electron beam. For example, admixture of $In_2O_3$, ZnO, $SnO_2$, or a combination ($In_{(2-x-y)}Sn_xM_yO_x$ (where M is at least one member of Sb, Cd, Zn, W, Ti, and Mo) thereof is disclosed (see Japanese patent Publication (JP-B) No. 55172/1982 "Method of Producing a Fluorescent Layer for a Vacuum Fluorescent Display", Japanese Patent Publication (JP-B) No. 23912/1977 "Blue-Emitting Low Voltage Electron Beam Excitation Vacuum Fluorescent Display", Japanese Unexamined Patent Publication (JP-A) No. 168683/1994 "Vacuum Fluorescent Display", and Japanese Unexamined Patent Publication (JP-A) No. 33185/1991 "Fluorescent Material and Method of Producing the Same").

On the other hand, in manufacture of the low voltage electron beam excitation phosphor display apparatus, various approaches for improving the brightness are introduced in respective processes. For example, in a screen printing process of printing a phosphor paste (the mixture of the phosphor, the conductive material, and a binder) onto the anode site, a different material such as ZnO particles, is added as a buffer in order to avoid deterioration in crystallinity of the surface of the phosphor as a result of mechanical friction with the screen (see Japanese Unexamined Patent Publication (JP-A) No. 168683/1994 "Fluorescent Display Tube"). Alternatively, in order to effectively adhere fine particles of, for example, the conductive material onto the surface of the phosphor, a water-soluble polymer or a solvent-soluble polymer is selectively used as a binder for preparing the phosphor polymer in dependence upon a solvent used in a different process (see Japanese Patent Publication (JP-B) No. 33266/1987 "Slow Electron Beam Excitation Fluophor and Method of Producing the Same".

Furthermore, disclosure is made of another method wherein, in a heating process (for example, at about 400°–500° C.) carried out to decompose and remove the binder of the phosphor paste printed on the anode site so that the phosphor film is adhered, prebaking is at first carried out in air at a lower temperature in order to avoid transformation and deterioration of the phosphor (sulfide such as ZnS, (Zn,Cd)S or oxisulfide such as $Y_2O_2S$) and then baking is carried out in a nonoxidizing atmosphere (see Japanese Patent Publication (JP-B) No. 58618/1989 "Method of Manufacturing a Display Apparatus"). It is also disclosed that, in the low voltage electron beam excitation light emission using an oxide phosphor ZnO:Zn widely used as a high-brightness green-emitting phosphor, deterioration and fluctuation in brightness can be avoided by the use of an admixture such as tungsten oxide because the admixture such as tungsten oxide is supposed to absorb a brightness deteriorating substance (supposed to be a gas component such as $H_2O$, $CO_2$) (see Japanese Patent Publication (JP-B) No. 9580/1991 "Vacuum Fluorescent Display and Method of Manufacturing the Same"). Also well known is a technical disclosure (Japanese Unexamined Patent Publication (JP-A) No. 106848/1992: Phosphors for Use in a Vacuum Fluorescent Display) teaching that, in order to more effectively obtain the similar effect, an admixture-free ZnO:Zn phosphor and an admixture-containing ZnO:Zn phosphor are admixed rather than simply admixing the admixture such as tungsten oxide. Likewise, as another approach for positively removing the brightness deteriorating factor to improve the brightness, various trials are disclosed. For example, treatment by active oxygen is followed by heat treatment in order to gasify and remove pollutants present on the surface of the phosphor as the brightness deteriorating factor (see Japanese Unexamined Patent Publication (JP-A) No. 35086/1991 "Treatment of Fluorescent Layer").

In multi-color display, use is made of a plurality of kinds of phosphors having different emission colors. If brightness balance among those emission colors is disturbed, color offset is observed. In this event, display quality is noticeably degraded. As known in the art, various modifications and improvements in manufacture have been proposed in order to keep the brightness balance within a predetermined range (for example, Japanese Unexamined Patent Publication (JP-A) No. 152782/1980: Fluorescent Material and Low Voltage Electron Beam Excitation Vacuum Fluorescent Display). In addition, various modifications and improvements have been proposed to prolong a lifetime inherent to the phosphor (taking into account the fact that the phosphor is transformed and degraded in brightness as a result of light-emission display for a long time, the term "lifetime" is defined as a time period after which the brightness is reduced to a half of an initial emission brightness) to at least several thousand hours. For example, a thin coating film or protection coating is formed on the surfaces of phosphor particles.

In the foregoing, description has been made in detail as regards the prior art relating to the low voltage electron beam excitation phosphor display apparatus in conjunction with the FIP by way of example. The FED being currently developed has similar problems resulting from the low voltage electron beam. For example, the above-mentioned Reference (4) describes current FED-related techniques including an approach to achieve high-brightness display at a low accelerating voltage (50V, 350V) by development and improvement of the phosphor, and another approach to achieve high-brightness display at a relatively high accelerating voltage (4–6 kV) using the phosphor for the high voltage electron beam for the CRT in order to avoid the problems arising from the low voltage electron beam. Unlike the FIP for displaying characters and designs (display colors typically ranging from several colors to ten colors at most), the FED is intended to display a moving picture and a video image in full color in the manner similar to the television. Therefore, the phosphor causing less color offset, in other words, excellent in brightness balance is particularly desired.

Summarizing, in the prior art relating to the low voltage electron beam excitation phosphor display apparatus, those phosphors performing light emission with a relatively high brightness are restricted and small in number. Even if the display apparatus is manufactured by simply using a phosphor having a desired composition, it is impossible to obtain the display apparatus which performs light emission display with a brightness of a practical level and which minimizes nonuniformity in brightness. In the state of the art, technical development and improvement of various kinds of manufacturing methods and conditions are energetically carried out in correspondence to the types of the phosphors (for example, sulfide, oxisulfide, oxide), as described in the foregoing.

As well known, the prior art relating to the low voltage electron beam excitation phosphor display apparatus as the FIP or the FED does not reach a technical level of the phosphor display apparatus using the high voltage electron beam, such as the one used in the television. As described above, in terms of the fineness or purity of the picture quality, the FIP has a level sufficient to display the characters and the designs. On the other hand, the FED intended to display the video image as fine as that provided in the television or the HDTV is still in the process of energetic development throughout the world and is not yet widely put into practical use. As regards multi-color display, the FIP can display several colors, at most ten colors, as described in the foregoing. On the other hand, in the FED being developed for full-color display comparable to the television, the development of the phosphor is a major technical problem as described in Reference (4) mentioned above.

The conventional red-based phosphor comprises a matrix composition of (Zn,Cd)S known as a highest-brightness (in red-based emission) phosphor and an activating agent added thereto in correspondence to a desired emission color and is extensively put into practical use. However, this phosphor disadvantageously includes cadmium which is a specific chemical substance. As described above, proposals have recently been made for the purpose of replacement of the phosphor (Zn,Cd)S (the above-mentioned Japanese Unexamined Patent Publications (JP-A) Nos. 310073/1995 and 310074/1995). In either publication, the red phosphor $Y_2O_2S$:Eu, which is well known but has been regarded impractical in view of the brightness, is used as a main component. The former publication (Japanese Unexamined Patent Publication (JP-A) No. 310073/1995) proposes a composition containing oxide $(Y_2O_3)$ in a predetermined concentration range ($1\times10^{-4}$ to $2\times10^{-3}$ in mol number) and describes that the the brightness is 1.5 times higher than that of a phosphor having a composition beyond the above-mentioned concentration range. The latter publication (Japanese Unexamined Patent Publication No. 310074/1995) teaches a composition $((Y_{1-x-y}La_xLn_y)_2O_2S)$: where Ln being Eu and/or Sm, $0<x\leq0.035; 0.01\leq y\leq0.1$) obtained by replacing a part of the element Y by La and describes that the composition achieves a brightness 1.5 times that of a composition containing no La. As apparent from the description in each of the above-mentioned publications, it is revealed, by varying the mixing ratio of a plurality of materials required to synthesize the phosphor and the synthesizing condition (specifically, the heating and baking temperature and the holding time for the synthesis within a crucible) and examining resultant phosphors for brightness and composition, that a relatively high brightness is achieved in a particular composition range. Thus, the above-mentioned publications are noticeable in that those phosphors having been neglected as being impractical can be improved with slight modification in composition to exhibit a high brightness. However, as described in conjunction with the prior art, those skilled in the art often experience that, even if the low voltage electron beam excitation phosphor display apparatus is manufactured by the use of the phosphor within the particular composition range, a desired light-emission characteristic is not obtained. If it is assumed that the desired light-emission characteristic is obtained by specifying the composition range, then a great problem is still present for practization. Specifically, it is necessary to find what manufacturing method or manufacturing condition is to be adopted in order that the composition of the phosphor finally obtained in the display apparatus via the manufacturing process falls within the above-mentioned particular composition range. In the above-mentioned two publications, no mention is made about the manufacture of the display apparatus. This leaves the problem in practization of the display apparatus. Admittedly, each publication is novel in that the composition of the phosphor contains no cadmium. However, comparison in brightness with the conventional red-based phosphor (ZnCd)S is not disclosed. It is therefore presumed that the emission brightness sufficient for replacement can not be obtained.

The prior art has following problems.

(a) In the prior art, (Zn,Cd)S containing cadmium which is a special chemical substance is widely used as the red-based phosphor. Thus, the prior art has problems such as environmental pollution. In recent years, cadmium-free phosphors have been disclosed. Such disclosure is useful in producing the phosphor. On the other hand, no disclosure is made about a practical method of manufacturing the display apparatus. Thus, the problem is left in manufacture of the display apparatus. In addition, the above-mentioned technical disclosure does not include any comparison in brightness with the conventional phosphor (Zn,Cd)S. Consequently, it is judged that the effect of the high-brightness emission sufficient for replacement is not yet achieved. Thus, the prior art does neither disclose a highly practical novel phosphor free from cadmium and capable of performing high-brightness red-based emission nor disclose the method of manufacturing the low voltage electron beam excitation phosphor display apparatus using the novel phosphor.

(b) In order to perform multi-color display using a plurality of emission colors (for example, R, G, and B) with high brightness, use is made of phosphors exhibiting different emission colors, as will readily be understood. In the prior art, those phosphors performing high-brightness light emission in response to the low voltage electron beam are restricted. As a result, use has been made of a plurality of types of the phosphors which are different compounds. Therefore, in manufacture of a multi-color display apparatus, it is impossible to individually determine an optimum manufacturing process or condition corresponding to each phosphor. Instead, pilot run is experimentally carried out in the common manufacturing process and condition or in several kinds of settings close thereto. Evaluation is then carried out and fluctuation factors are considered to determine a final setting.

As mentioned above, in multi-color display in the prior art, different phosphors are inevitably required. It is therefore difficult to determine the setting in manufacture so as to achieve an optimum light-emission characteristic for each phosphor. As a result, it is impossible to manufacture the display apparatus fully utilizing the light-emission characteristics (brightness, color tone, emission efficiency, lifetime) of each phosphor.

(c) In the display apparatus for providing multi-color display by mixture of a plurality of emission colors, difference in emission characteristic resulting from fluctuation factors in manufacture, particularly, slight difference in emission brightness results in occurrence of color offset in display, as known in the art. In this event, the display apparatus is extremely poor in color reproducibility. In the prior art using the low voltage electron beam in which different phosphors are inevitably required and result in a great problem in manufacture, variation in emission brightness is different in dependence upon each type of the phosphor because of difference in chemical nature of the phosphors, even if subjected to the same fluctuation factor during manufacture. Thus, color offset is inherently easy in this structure. The above-mentioned problem in manufacture is particularly serious in the FED for displaying a full-color video image as a mixture of the three emission colors (R, G, B) in the manner similar to the television.

(d) As described above, the phosphor is degraded in emission brightness by lighting for a long time and has a so-called emission lifetime (desirably, at least several thousand hours, more desirably, at least twenty or thirty thousand hours). The different types of the phosphors do not have the same lifetime. In the phosphor technique related to the fast electron beam such as for the television, the above-mentioned problem has been solved. On the other hand, in the phosphor technique related to the low voltage electron beam, no solution has been reached yet, as described above. In the prior art, the multi-color display apparatus using different phosphors for mixture of the emission colors from the respective phosphors inherently has a following problem. During a long time usage (for example, for several years), phosphors are degraded their light emission ability due to the electron bombardment of long term, and diminish the brightness. Moreover, the degradation generally differs in phosphors of a different compound. A brightness unbalance, thus caused, among R, G, B colors are easily observed, in the case of video movies, as pictures with a poor color balance.

SUMMARY OF THE INVENTION

It is therefore an object of this invention to provide a low voltage electron beam excitation phosphor display apparatus which uses a phosphor free from any harmful substance such as cadmium, which can be driven at a low voltage, which has a high brightness equivalent or superior to that of a conventional apparatus using cadmium, and which is inexpensive.

It is another object of this invention to provide and to provide a method of manufacturing the low voltage electron beam excitation phosphor display apparatus.

A low voltage electron beam excitation phosphor display apparatus to which this invention is applicable comprises a vacuum chamber, an anode having a principal surface and enclosed in the vacuum chamber, a phosphor film formed on the principal surface, and a cathode enclosed in the vacuum chamber opposite to the phosphor film for emitting a low voltage electron beam towards the anode to excite the phosphor film to emit light. The phosphor film comprises a conductive material and a phosphor which consists essentially of an oxisulfide and an oxide inevitably formed on a surface of the phosphor on manufacturing the apparatus. The oxisulfide is represented by $Ln_2O_2S:R$, where Ln is at least one selected from a group consisting of Gd, La, Y, and Lu and where R is a rare-earth element.

According to this invention, a quantity of the oxide in the phosphor is at most $2.0 \times 10^{-5}$ mol/m$^2$.

A method to which this invention is applicable is for manufacturing a low voltage electron beam excitation phosphor display apparatus comprising a vacuum chamber, an anode having a principal surface and enclosed in the vacuum chamber, a phosphor film formed on the principal surface, and a cathode enclosed in the vacuum chamber opposite to the phosphor film for emitting a low voltage electron beam towards the anode to excite the phosphor film to emit light. The method includes an anode-forming step of forming the anode on an insulating substrate constituting the vacuum chamber.

According to this invention, the method comprises: a preparing step of preparing a phosphor which consists essentially of an oxisulfide and an oxide inevitably formed on a surface of the phosphor on preparing the phosphor, the oxisulfide being represented by $Ln_2O_2S:R$, where Ln is at least one selected from a group consisting of Gd, La, Y, and Lu and where R is a rare-earth element; a removing step of removing the oxide from the phosphor to produce an oxide-removed phosphor; a coating step of coating, on the principal surface of the anode, a paste comprising a mixture of the oxide-removed phosphor, a conductive material, and an autolytic type binder; a binder-heating step of heating the binder of the paste in a nonoxidizing atmosphere to form, on the principal surface of the anode, the phosphor film comprising the oxide-removed phosphor and the conductive material; and an enclosing step of enclosing the anode and the cathode in the vacuum chamber to obtain a manufactured low voltage electron beam excitation phosphor display apparatus.

This invention will herein be summarized. By the use of known phosphors free from cadmium, examination is made about the couse of low-brightness light emission thereof. By removing the couse, a novel fact is found that the above-described phosphor among a wide variety of the phosphors performs high-brightness light emission equivalent or superior to that of (Zn,Cd)S containing cadmium. Furthermore, the method of manufacturing the display apparatus without deteriorating high-brightness emissivity of the phosphor is found. In this manner, this invention has been reached.

Specifically, according to this invention, the oxide is removed from the phosphor. Furthermore, oxidation of the phosphor during the manufacturing process of the phosphor display apparatus is suppressed. In this manner, the emission efficiency of the phosphor is maintained. In addition, absorption of the low voltage electron beam by oxide is reduced so that the irradiation of the low voltage electron beam onto the phosphor of oxisulfide is substantially increased. As a result, the emission brightness of the phosphor display apparatus is remarkably increased as compared with the prior art.

Thus, the low voltage electron beam excitation phosphor display apparatus according to this invention has a brightness increased by reducing the oxide inevitably formed, on manufacturing the apparatus, on a surface of the phosphor including the oxisulfide.

DESCRIPTION OF THE PREFERRED EMBODIMENT

Now, description will be made about an embodiment of this invention with reference to the drawing.

Figure 1:
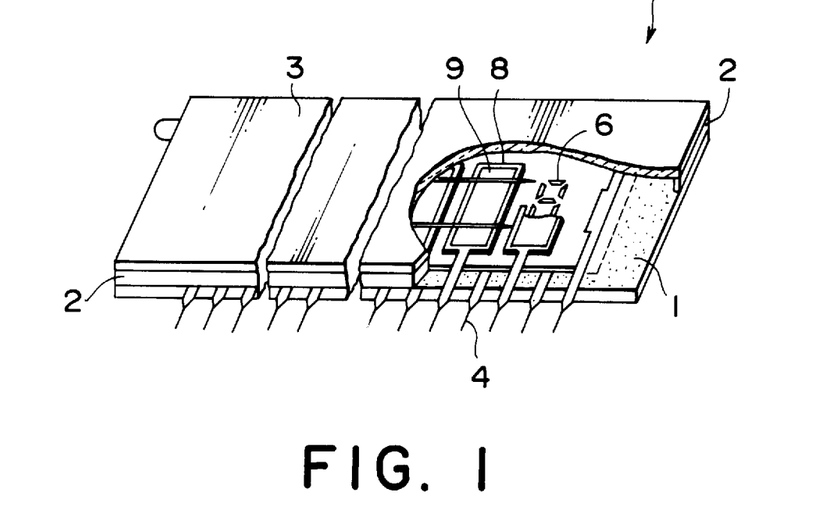
FIG. 1 is a partially cutaway perspective view of a low voltage electron beam excitation phosphor display apparatus according to an embodiment of this invention.
Figure 2:
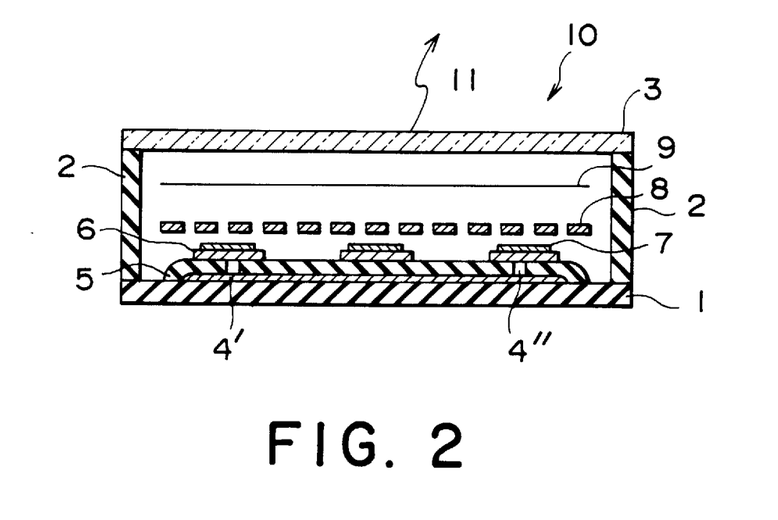
FIG. 2 is a sectional view of the low voltage electron beam excitation phosphor display apparatus illustrated in FIG. 1.

FIGS. 1 and 2 are a partially cutaway view and a side sectional view of a low voltage electron beam excitation phosphor display apparatus 10 according to an embodiment of this invention, respectively. In FIGS. 1 and 2, a red-emitting phosphor display tube is illustrated as one of typical low voltage electron beam excitation phosphor display apparatuses.

In FIGS. 1 and 2, the low voltage electron beam excitation phosphor display apparatus 10 includes a vacuum chamber (constituted by a glass substrate 1, a side plate 2, and a glass cover 3), anode conductors 6 enclosed in the vacuum chamber, phosphor films 7 formed on principal surfaces of the anode conductors 6, and filament cathodes 9 enclosed in the vacuum chamber opposite to the phosphor films 7 for emitting low voltage electron beams towards the anode conductors 6 to excite the phosphor films 7 to emit light 11.

The anode conductors 6 are formed on an insulator layer 5 formed on the glass substrate 1 so that the anode conductors 6 are connected to lead lines 4. Grids 8 are arranged between the phosphor films 7 formed on the principal surfaces of the anode conductors 6 and the filament cathodes 9. A reference numeral 4' represents a conductor pattern. Another reference numeral 4" represents a connector conductor arranged in a through-hole formed in the insulator layer 5 to connect the conductor pattern 4' and each anode conductor 6. An internal space of the vacuum chamber is kept at a vacuum.

Each phosphor film 7 includes a conductive material and a phosphor which consists essentially of an oxisulfide and an oxide inevitably formed on a surface of the phosphor on manufacturing the apparatus. The oxisulfide is represented by $Ln_2O_2S:R$, where Ln is at least one selected from a group consisting of Gd, La, Y, and Lu and where R is a rare-earth element. The oxide is typically represented by $Ln_2O_3$ into which a component $Ln_2O_2S$ of the oxisulfide is changed with S of the component $Ln_2O_2S$ displaced by O. A quantity of the oxide in the phosphor is at most $2.0 \times 10^{-5}$ mol/m$^2$ as will later be described.

In the phosphor used in the low voltage electron beam excitation phosphor display apparatus, a portion related to light emission is restricted to the extreme vicinity of the surface of the phosphor because of irradiation of the electron beam at a slow speed (for example, this is described in detail in "Phosphor Handbook", p. 303 (published by Ohm Corporation, December 1987)).

Therefore, the surface condition of the phosphor has a great influence as a factor determining the emission characteristic of the phosphor.

As a result of examination of various phosphors including the oxisulfide represented by $Ln_2O_2S:R$, the present inventors have found that the quantity of oxide $Ln_2O_3$ remained on the surface of the phosphor is closely related to the light-emission characteristic of the low voltage electron beam excitation phosphor display apparatus and that an increased quantity of the oxide on the surface of the phosphor degrades brightness of the low voltage electron beam excitation phosphor display apparatus. From these viewpoints, this invention makes it possible to increase the brightness of the low voltage electron beam excitation phosphor display apparatus by reducing the quantity of the oxide inevitably formed on the surface of the phosphor.

In FIG. 2, description will be made about a method of manufacturing the low voltage electron beam excitation phosphor display apparatus. The insulator layer 5 and the conductor pattern 4' are formed on the glass substrate 1. Each anode conductor 6 is formed on the insulator layer 5.

Each phosphor is prepared which consists essentially of the oxisulfide and the oxide inevitably formed on the surface of the phosphor on preparing the phosphor.

The oxide is removed from the phosphor to produce an oxide-removed phosphor. In this event, such removing step is carried out by either an etching step of etching the oxide by the use of acid or a phosphor-heating step of heating the phosphor in a nonoxidizing atmosphere to remove the oxide from the phosphor to thereby produce the oxide-removed phosphor. The nonoxidizing atmosphere in the phosphor-heating step is selected from a reducing atmosphere of carbon, a reducing atmosphere of a mixture of hydrogen and an inert gas, and a neutral atmosphere of nitrogen. Alternatively, the removing step is carried out by the etching step and the phosphor-heating step. The removing step may be carried out by a heating step of heating, in a reducing atmosphere with any one of sulfur and sulfur-compound mixed to the phosphor at a mixing ratio of 0–80 mol % (0 exclusive and 80 inclusive) with respect to the phosphor, the phosphor to remove the oxide from the phosphor.

On the principal surface of each anode conductor 6, a paste including a mixture of the oxide-removed phosphor, the conductive material, and an autolytic (or self-decomposition) type binder. The autolytic binder is at least one selected from a group consisting of polyethylene oxide and acrylic resin. The binder of the paste is heated in a nonoxidizing atmosphere to form, on the principal surface of each anode conductor 6, each phosphor film 7 comprising the oxide-removed phosphor and the conductive material.

The anode conductors 6 formed on the glass substrate 1, the grids 8, and the filament cathodes 9 are enclosed in the vacuum chamber to obtain a manufactured low voltage electron beam excitation phosphor display apparatus.

As mentioned above, a quantity of a resultant oxide is at most $2.0 \times 10^{-5}$ mol/m$^2$ in the phosphor of the phosphor film 7 of the manufactured low voltage electron beam excitation phosphor display apparatus.

Preferably, the quantity of the resultant oxide is at most $1.5 \times 10^{-5}$ mol/m$^2$ in the phosphor of the phosphor film 7 of the manufactured low voltage electron beam excitation phosphor display apparatus when the oxisulfide is represented by $Gd_2O_2S:R$.

When the oxisulfide is represented by $Y_2O_2S:R$, the quantity of the resultant oxide is preferably at most $0.05 \times 10^{-5}$ mol/m$^2$ in the phosphor of the phosphor film 7 of the manufactured low voltage electron beam excitation phosphor display apparatus.

Next, description will be made about the method of manufacturing the low voltage electron beam excitation phosphor display apparatus in detail.

The phosphor comprising a matrix of $Ln_2O_2S$ (where Ln is at least one of La, Gd, Y, Lu) baked by a typical manufacturing process (for example, described in Japanese Unexamined Patent Publication (JP-A) No. 310073/1995) is rinsed to fully remove the flux. After dried, the surface is etched by the use of acid such as hydrochloric acid and acetic acid. Alternatively, sulfur or sulfur compound such as sulfite ions is mixed at a ratio between 0 and 80 mol % (0 exclusive and 80 inclusive) in terms of sulfur with respect to the phosphor and baking is carried out for 1–20 hours at a temperature between 500° and 1000° C. in a nonoxidizing atmosphere, such as a reducing atmosphere of carbon, a reducing atmosphere of hydrogen gas, and a neutral atmosphere of nitrogen gas, each having oxygen concentration of 0.1 vol % or less. By carrying out at least one of the foregoing treatments, the oxide in the matrix of the phosphor can be removed or reduced.

Upon manufacture of the phosphor display apparatus, the phosphor is subjected to thermal hysteresis during the manufacturing process. Particularly, upon baking the phosphor film containing a binder, a baking process is carried out in air at a temperature between 400° and 600° C. in order to burn out the binder. In this process, the phosphor reacts with oxygen in air to produce oxide at a part of the matrix of the phosphor. This constitutes a major factor of degradation in brightness. In order to prevent the production of oxide, baking of the phosphor film is carried out in the nonoxidizing atmosphere to suppress oxidation of the phosphor.

Accordingly, it is necessary to use the binder of an autolytic type requiring no oxygen. The autolytic type binder is classified into an autolytic binder requiring no oxygen upon decomposition of the binder, a sublimation binder to be sublimated, and a binder to be sublimated after autolysis. As the autolytic type binder, use can be made of acrylic resin, polyethylene oxide, and the like.

In this manner, the phosphor film can be baked in the nonoxidizing atmosphere without coloration while oxidation of the matrix of the phosphor is suppressed. Thus, high-brightness effect of the phosphor display tube is achieved. Preferably, not only the baking process but also any other heating process having possibility of oxidation of the phosphor are carried out in the nonoxidizing atmosphere. In this event, a high-brightness effect is achieved in the phosphor display apparatus using an accelerating voltage corresponding to a slower velocity.

In order to form a conventional phosphor film, use is typically made of a cellulose binder such as ethyl cellulose and nitro cellulose (as described in Japanese Unexamined Patent Publication (JP-A) No. 43088/1984, for example). Those phosphor films using the above-mentioned binders require oxygen upon baking in order to oxidize and burn out such resin component. If oxygen is insufficient upon baking, the resin component causes incomplete combustion. As a result of the incomplete combustion, carbon remains on the phosphor film so that the phosphor film exhibits dark brown or gray to become a colored phosphor film. This dramatically reduces the emission brightness of the phosphor in the display apparatus. In view of the above, those binders requiring oxygen upon decomposition are unfavorable because baking in the nonoxidizing atmosphere degrades the brightness of the phosphor display apparatus. In contrast, with the binder and the baking condition of this invention, it is possible to form the phosphor film without coloration and with oxidation of the matrix of the phosphor suppressed. Thus, high brightness can be achieved.

Since the light emission of the phosphor in low voltage electron beam excitation occurs in its extreme surface, the brightness is not affected by the quantity of oxide contained in a whole of the phosphor but by the quantity of oxide present at and around the surface of the phosphor. Thus, the quantity of oxide per surface area of the phosphor affects the emission brightness of the phosphor display apparatus.

Accordingly, even if the total quantity of oxide is same, the surface area of the phosphor is different if the particle size of the phosphor is different. In this event, the quantity of oxide per surface area of the phosphor is different so that the emission brightness of the phosphor display apparatus is not same.

The above-described low voltage electron beam excitation phosphor display apparatus according to this invention achieves a practical level by the use of a novel high-brightness phosphor free from any harmful substance instead of the conventional phosphor (Zn,Cd)S:Ag,Cl using cadmium.

Furthermore, by the use of oxisulfide as a matrix and the activating agent selected from various rare-earth elements, multi-color light emission is possible. Thus, the phosphor can be rendered multi-color with a single kind of matrix. Therefore, it is possible to prevent the balance in emission colors from being disturbed with the lapse of time of lighting the phosphor display apparatus. As a result, the color offset of the display apparatus is suppressed over a long period of time.

Now, description will be made as regards examples of this invention with reference to the drawing.

(EXAMPLE 1)

After baked by a typical baking technique (for example, see Japanese Unexamined Patent Publication (JP-A) No. 310073/1995), rinsed, and dried, a phosphor $Gd_2O_2S$:Eu (Eu being added at 2.5 mol % with respect to $Gd_2O_2S$) of 500 g was suspended in pure water of 2 L (liters). The suspension was adjusted by hydrochloric acid (highest-quality reagent) to have pH of 3.0 and then agitated for 30 minutes. Thereafter, elution was fully washed by decantation, dehydrated, and dried to obtain an etched phosphor.

Sulfur (S) powder (fineness of 4N, #200 mesh) of 7.6 g (20 mol % with respect to the etched phosphor) was added to the above-mentioned etched phosphor of 450 g and mixed by a blender. A resultant mixture was put in an alumina crucible which was then put in a greater crucible together with activated carbon. The crucible was closed and heated in a baking furnace at 500° C. for four hours. Thus, heating treatment was carried out in a carbon reducing atmosphere as a nonoxidizing atmosphere to remove oxide.

Then, the crucible was taken out from the baking furnace and cooled to the room temperature. Thereafter, the phosphor subjected to oxide removal was taken out and made to pass through a Tetron mesh of #200 in order to remove bulk particles and foreign particles.

Next, with respect to the phosphor of 100 weight part after the treatment in the above-mentioned atmosphere, indium oxide of 15 weight part as a conductive material and an organic vehicle (a mixed solution obtained by dissolving acrylic resin of 30 weight part, butyl carbitol acetate of 40 weight part, terpioneol of 15 weight part, and butyl lactate of 15 weight part) of 30 weight part were added and mixed to prepare a phosphor paste.

The above-mentioned paste was printed by screen printing on a typical glass substrate for a phosphor display apparatus to form a phosphor film which was then dried at 100° C. for 60 minutes.

Thereafter, the above-mentioned glass substrate with the phosphor film was put in a furnace filled with the nonoxidizing atmosphere fully replaced by nitrogen and baked at 450° C. for 20 minutes. At a substrate temperature of 150° C. or more, the furnace was continuously kept at the nitrogen atmosphere. At a temperature not higher than 100° C., the glass substrate was taken out from the furnace.

In subsequent heating processes, the phosphor film was continuously held in the nonoxidizing atmosphere. Thus, the phosphor display tube illustrated in FIGS. 1 and 2 was manufactured. As described above, the phosphor display tube 10 comprises the chamber which includes the filament cathode 9, the grid electrode 8, and the anode conductors 6 mounted on the glass substrate 1 and which is enclosed in the nonoxidizing atmosphere, evacuated into vacuum, and sealed.

An oxide quantity M in a phosphor composition collected from the phosphor display tube thus produced was calculated by the following Equation to obtain $1.35 \times 10^{-5}$ mol/m² as $Gd_2O_3$.

$$M(\text{mol/m}^3) = W \times r \times \rho / (100 \times 3 \times A \times 2)$$

W: weight of oxide (wt %)
r: radius of phosphor particles $$(\mu m = 1 \times 10^{-6} m)$$

$\rho$: density (g/m³)
A: mole weight (g/mol)

The oxide quantity in the foregoing Equation is used because the oxide quantity per unit area of the phosphor is correlated with the brightness of the phosphor display tube. If a particle size of the phosphor is different even if the weight content of oxide is same, the thickness of the oxide film formed on the surface of the phosphor particle differs so that the brightness is different. At the same weight of the phosphor, if the particle size of the phosphor is smaller, the total surface area of the phosphor is increased and the oxide film becomes thinner so that the low voltage electron beam easily transmits. The transmission quantity of the low voltage electron beam is related to the thickness of oxide, namely, the oxide weight per unit surface area of the phosphor and is thus correlated with the brightness of the phosphor display tube.

The brightness of the phosphor display tube was measured by a luminance meter (manufactured by Topcon, Model BM-7) when the phosphor display tube was lit at the room temperature by applying an anode voltage of 30V, a cathode voltage of 1.5V, and a grid voltage of 17V.

As a result, the brightness of 1044 cd /m$^2$ was achieved with the above-mentioned phosphor display tube as shown in the examples given in Table 1 below.

The result obtained about the phosphor tube prepared by the conventional method is shown in Table 1 as a comparative example 1. In the comparative example 1, etching of the phosphor and the treatment of the phosphor in the nonoxidizing atmosphere were not carried out and the phosphor film was baked in air. The oxide quantity in the phosphor collected from the phosphor tube thus obtained was equal to 3.66×10$^{-5}$ mol/m$^2$ and the brightness of the phosphor tube was 171 cd /m$^2$.

Another phosphor display tube was prepared by another conventional method in which the phosphor (Zn,Cd)S:Ag,Cl was used and the phosphor was baked in air without carrying out treatment of the phosphor in the nonoxidizing atmosphere. The brightness was equal to 1108 cd /m$^2$ as shown in Comparative Example 5.

Therefore, the improvement in brightness in the phosphor display apparatus according to this invention is 6.1 times as compared with the conventional phosphor Gd$_2$O$_2$S (Comparative Example 1). As compared with the conventional phosphor (Zn,Cd)S:Ag,Cl (Comparative Example 5) containing Cd, the brightness of light emission is substantially equivalent.

Herein, the above-mentioned nonoxidizing atmosphere is a neutral atmosphere or a reducing atmosphere. The neutral atmosphere comprises at least one of a nitrogen gas and various inert gases (argon, neon, and the like). The reducing atmosphere comprises a gas of at least one of carbon, hydrogen sulfide, sulfur. However, the atmosphere is not restricted to those mentioned above.

TABLE 1

| Embodiment | Phosphor | Acid Etching | Addition of S (mol %) | Treatment Atmosphere (°C.) | Treatment Temperature(°C.) | Binder | Atmosphere | Baking Temperature(°C.) | Oxide Quantity | Brightness d/m$^2$ |
|---|---|---|---|---|---|---|---|---|---|---|
| 1 | GOS:Eu | HCl pH3 | 20 | C | 500 | acryl | N$_2$ | 450 | 1.35 | 1044 |
| 2 | GOS:Eu | HCl pH3 | 20 | C | 600 | acryl | N$_2$ | 500 | 0.795 | 1370 |
| 3 | GOS:Eu | HCl PH3 | 20 | C | 750 | acryl | N$_2$ | 500 | 0.795 | 1233 |
| 4 | GOS:Eu | HCl pH3 | 20 | C | 900 | acryl | N$_2$ | 500 | 0.954 | 1268 |
| Reference Example 1 | GOS:Eu | — | — | — | — | acryl | Air | 500 | 3.2 | 240 |
| 5 | GOS:Eu | HCl pH3 | — | C | 750 | acryl | N$_2$ | 500 | 1.03 | 1165 |
| 6 | GOS:Eu | HCl pH3 | 20 | N$_2$ + H$_2$ | 750 | acryl | N$_2$ | 450 | 0.874 | 1182 |
| 7 | GOS:Eu | HCl pH3 | 20 | N$_2$ | 750 | acryl | N$_2$ | 450 | 0.954 | 1165 |
| 8 | GOS:Eu | HCl pH0.2 | 20 | C | 750 | acryl | N$_2$ | 500 | 0.119 | 1747 |
| Reference Example 2 | GOS:Eu | — | 20 | C | 750 | acryl | N$_2$ | 500 | 1.35 | 994 |
| 9 | GOS:Eu | HAc pH2.2 | 20 | C | 750 | acryl | N$_2$ | 500 | 0.334 | 1405 |
| Comparative Example 1 | GOS:Eu | — | — | — | — | EC | Air | 500 | 3.56 | 171 |
| 10 | LOS:Eu | — | 20 | C | 750 | acryl | N$_2$ | 500 | — | 857 |
| Comparative Example 2 | LOS:Eu | — | — | — | — | EC | Air | 500 | — | 210 |
| 11 | YOS:Eu | HCl pH1.5 | 20 | C | 750 | acryl | N$_2$ | 500 | 0.297 | 700 |
| Reference Example 3 | YOS:Eu | — | — | — | — | acryl | Air | 450 | 0.42 | 230 |
| 12 | YOS:Eu | HCl pH1.5 | 40 | C | 900 | acryl | N$_2$ | 500 | 0.019 | 1130 |
| 13 | YOS:Eu | HCl pH1.5 | 60 | C | 900 | acryl | N$_2$ | 500 | 0.046 | 1038 |
| Comparative Example 3 | YOS:Eu | — | — | — | — | EC | Air | 500 | 0.46 | 154 |
| 14 | GOS:Tb | HCl pH3 | 20 | C | 750 | acryl | N$_2$ | 500 | 0.795 | 1542 |
| Comparative Example 4 | GOS:Tb | — | — | — | — | EC | Air | 500 | 3.47 | 257 |
| Comparative Example 5 | ZnCdS:Ag,Cl | — | — | — | — | EC | Air | 500 | — | 1108 |

GOS = Gd$_2$O$_2$S, LOS = La$_2$O$_2$S, YOS = Y$_2$O$_2$S
HCl = hydrochloric acid, HAc = acetic acid, EC = ethyl cellulose
Oxide Quantity = ×10$^{-5}$ mol/m$^2$ An analysis of oxide in the phosphor was carried out on samples collected from the phosphor powder or the phosphor film of the phosphor display tube. A 10-fold diluted acetic acid solution (the highest-grade JIS reagent being diluted) of 5 ml was added to each sample phosphor of 0.5 g. After agitating for 30 minutes, an insoluble residue was filtered and removed. Then, a quantitative analysis was carried out by ICP. Simultaneously, a plurality of phosphor display tube samples were prepared partially for use in measurement of oxide in the phosphor and partially for use in measurement of optical characteristics.

An acid-soluble portion in this analysis is assumed to contain, in addition to pure oxide, hydroxide and a phosphor part of poor crystallinity both of which are believed to adversely affect light emission of the phosphor display tube. In the examples of this invention, evaluation was carried out upon the total of these substances as the oxide quantity.

The oxide quantity on the surface of the phosphor is different in dependence upon the surface area of the phosphor, namely, the particle size and is therefore obtained with respect to an average particle size of the phosphor particles. Herein, values of F.S.S.S. numbers by the Fischer's method are represented in terms of microns. The surface area is calculated assuming that the phosphor particles are spheres. By the foregoing equation, the oxide quantity per surface area of 1 m$^2$ (mol/m$^2$) is calculated. In this manner, it is revealed that high-brightness light emission was achieved with a smaller value of oxide.

(EXAMPLE 2)

In the manner similar to Example 1 except that the phosphor powder was subjected to treatment in the reducing atmosphere at 600° C. for four hours and the phosphor film was baked at 500° C., a red-emitting phosphor display tube was obtained. As a result, the emission brightness of the phosphor display apparatus was equal to 1370 cd /m$^2$. As compared with the conventional apparatus (Comparative Example 1), high brightness of 8.0 times was achieved.

(EXAMPLE 3)

In the manner similar to Example 2 except that the phosphor powder was subjected to treatment in the reducing atmosphere at 750° C. for four hours, a red-emitting phosphor display tube was obtained. The brightness of the phosphor display tube was equal to 1233 cd/m$^2$. As compared with Comparative Example 1, high brightness of 7.2 times was achieved.

(EXAMPLE 4)

In the manner similar to Example 2 except that treatment in the reducing atmosphere was carried out at 900° C. for four hours, a red-emitting phosphor display tube was obtained. The brightness of the phosphor display tube was equal to 1268 cd/m$^2$. As compared with Comparative Example 1, high brightness of 7.4 times was achieved.

As Reference Example 1, reducing treatment of the phosphor powder was carried out at 900° C. for four hours in the manner similar to that mentioned above and the phosphor film was baked in air. In this event, the oxide quantity is as large as 3.20×10$^{-2}$ mol/m$^2$. The emission brightness of the phosphor display tube was equal to 240 cd/m$^2$. Thus, substantial improvement in brightness was not achieved.

(EXAMPLE 5)

In the manner similar to Example 3 except that the addition of sulfur was 0 g in the treatment of the phosphor powder in the reducing atmosphere, a red-emitting phosphor display tube was obtained. The emission brightness of the phosphor tube was 1165 cd/m$^2$. As compared with Comparative Example 1, high brightness of 6.8 times was achieved.

(EXAMPLE 6)

After baked by a typical baking technique (for example, as described in Japanese Unexamined Patent Publication (JP-A) No. 310073/1995), rinsed for removal of the flux, and dried, a phosphor Gd$_2$O$_2$S:Eu (2.5 mol % Eu being added with respect to Gd$_2$O$_2$S) of 500 g was suspended in pure water of 2 L. The suspension was adjusted by hydrochloric acid (highest-quality reagent) to have pH of 3.0 and then agitated for 30 minutes. Thereafter, elution was fully washed by decantation, dehydrated, and dried to obtain an etched phosphor.

Sulfur (S) powder (fineness of 4N, #200 mesh) of 7.6 g (20 mol % with respect to the phosphor) was added to the above-mentioned etched phosphor of 450 g and mixed by a blender. A resultant mixture was put in an alumina crucible which was then closed. The crucible was introduced into a cylindrical atmospheric furnace and heated at 750° C. for four hours while introducing a mixed gas of nitrogen gas and hydrogen gas at a ratio of 5:1. Thus, treatment in a reducing atmosphere comprising the mixture of hydrogen and inert gas was carried out to remove oxide. Next, with the above-mentioned atmosphere maintained, the crucible was cooled down to the room temperature. Thereafter, the phosphor was taken out from the crucible and made to pass through a Tetron mesh of #200 in order to remove bulk particles and foreign matter.

The subsequent process after production of the phosphor film was carried out in the manner similar to Example 1 to obtain a red-emitting phosphor display tube. The emission brightness of the phosphor display tube was 1182 cd/m$^2$. Thus, high brightness of 6.9 times was achieved as compared with Comparative Example 1.

Hydrogen reducing treatment of the phosphor powder is also effective in improvement of the emission brightness.

(EXAMPLE 7)

In the manner similar to Example 6 except that, in the atmospheric treatment of the phosphor powder, the interior of the treatment furnace was replaced by the nitrogen gas and then neutral atmosphere treatment was carried out in a stream of nitrogen gas at a rate of 2 L/min. Thus, a red-emitting phosphor display tube was obtained. The emission brightness of the phosphor display tube was equal to 1165 cd/m$^2$. As compared with Comparative Example 1, high brightness of 6.8 times was achieved.

(EXAMPLE 8)

In the manner similar to Example 3 except that, in etching of the phosphor powder, the pH was adjusted by hydrochloric acid to 0.2, a red-emitting phosphor display tube was obtained. The emission brightness of the phosphor display tube was equal to 1747 cd/m$^2$. As compared with Comparative Example 1, high brightness of 10.2 times was achieved.

In the manner similar to Example 3 except that etching by hydrochloric acid was not carried out, a red-emitting phosphor display tube was obtained as Reference Example 2. The emission brightness of the phosphor display tube was equal to 994 cd/m$^2$. As compared with Comparative Example 1, high brightness of 5.8 times was achieved.

(EXAMPLE 9)

In the manner similar to Example 3 except that, in acid etching of the phosphor powder, acetic acid (highest-quality reagent) was used to adjust the pH to 2.2, a red-emitting phosphor display tube was obtained. The emission brightness of the phosphor display tube was equal to 1405 cd/m$^2$. As compared with Comparative Example 1, high brightness of 8.2 times was achieved.

As acid etching, acetic acid etching is also effective in removal of oxide.

Figure 3:
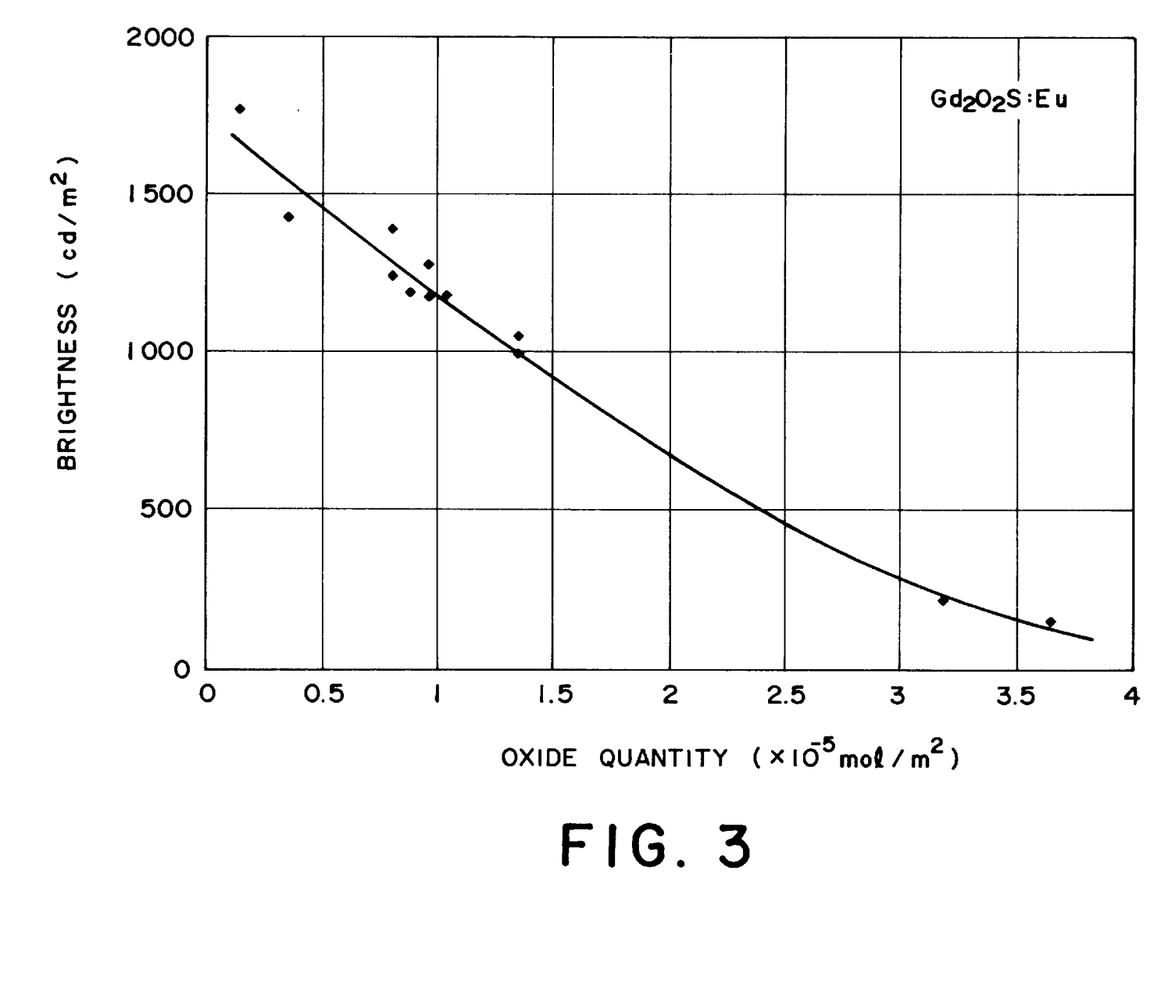
FIG. 3 is a graph which is for use in describing a low voltage electron beam excitation phosphor display apparatus according to this invention and which shows a relationship between an oxide quantity in a phosphor including an oxisulfide $Gd_2O_2S:Eu$ and brightness of the low voltage electron beam excitation phosphor display apparatus including the phosphor.

As regards the phosphor $Gd_2O_2S:Eu$, the relationship between the oxide quantity in the phosphor of the phosphor display tube and the brightness of the phosphor display tube is shown in FIG. 3. It will be understood that the smaller the oxide quantity contained in the phosphor is, the higher the brightness becomes. It is effective when the oxide quantity is equal to $2.0\times10^{-5}$ mol/m$^2$ or less. It is preferable when the oxide quantity is equal to $1.5\times10^{-5}$ mol/m$^2$ or less. The smaller amount provides higher brightness.

Figure 4:
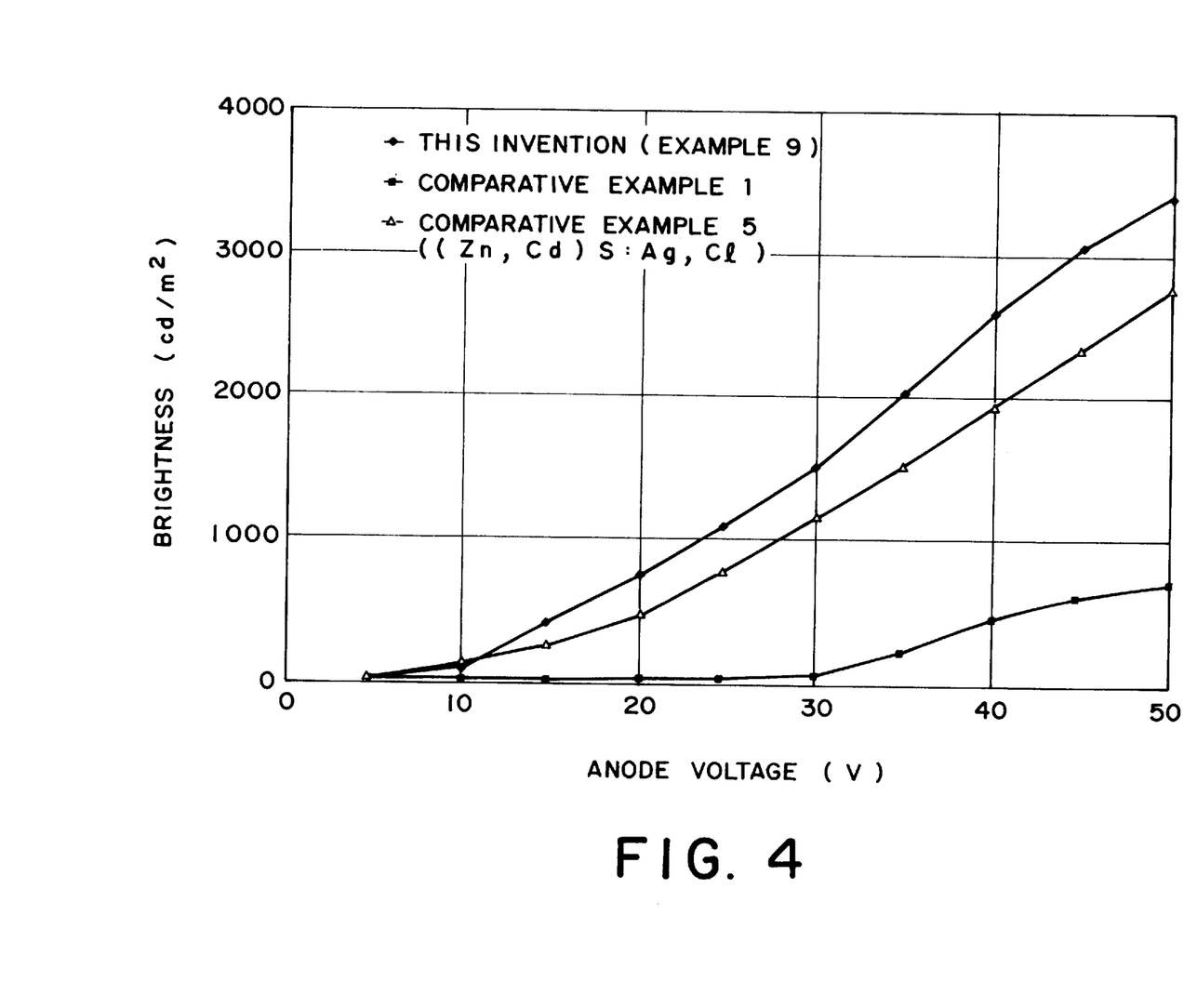
FIG. 4 is a graph showing a relationship between brightness of the low voltage electron beam excitation phosphor display apparatus and an anode voltage for both this invention and the prior art.

Variation in brightness following the change in anode voltage is shown in FIG. 4 for the phosphor display tube (Example 9) using $Gd_2O_2S:Eu$ of this invention, the conventional phosphor display tube (Comparative Example 1), and the conventional phosphor display tube (Comparative Example 5) containing Cd. It will be understood that the phosphor display tube of this invention exhibits a high brightness. The brightness and the emission color are equivalent to the phosphor display tube using the phosphor containing cadmium. Therefore, replacement is at all possible.

As regards baking of the phosphor film, oxidation of the phosphor $Gd_2O_2S:Eu$ was already observed upon heating at 300° C. With an increase of the baking temperature, oxidation of the phosphor progresses so that the emission brightness as the display apparatus is degraded.

Japanese Patent Publication (JP-B) No. 58618/1989 specifies 360°–400° C. as the baking condition of the phosphor film. In baking at such temperature, oxidation of the phosphor is inevitable so that the high-brightness effect of this invention can not be achieved. In particular, as the accelerating voltage of the phosphor display apparatus becomes lower, the influence of oxidation of the phosphor becomes greater so that the emission brightness of the phosphor display tube is degraded. Table 2 shows the result.

TABLE 2

| Anode Voltage (V) | Oxide Quantity ($\times 10^{-5}$ mol/m$^2$) | | |
| --- | --- | --- | --- |
| | 0.12 | 1.1 | 3.7 |
| 10 | 121.4 | 20.2 | 1.00 |
| 30 | 10.3 | 4.1 | 1.00 |
| 50 | 3.1 | 1.9 | 1.00 |
| 70 | 1.6 | 1.2 | 1.00 |

As the accelerating voltage becomes lower, the adverse influence by the oxide quantity is caused so that the brightness is degraded. In other words, the smaller the oxide quantity is, the greater the increase of the brightness when the anode voltage is low. Table 2 will hereafter be described. The conventional apparatus (Comparative Example 1) having a great oxide quantity ($3.66\times10^{-5}$ mol/m$^2$) is used as a reference and assumed to have a relative brightness of 1.00. When the oxide quantity is reduced to $1.1\times10^{-5}$ mol/m$^2$ and $0.12\times10^{-5}$ mol/m$^2$, improvement in brightness is 1.2 times and 1.6 times, respectively, when the anode voltage is as high as 70V. On the other hand, when the anode voltage is as low as 30V, the improvement is 4.1 times and 10.3 times, respectively. Furthermore, when the anode voltage is a low voltage of 10V, improvement in brightness is 20.2 times and 121.4 times. Therefore, the phosphor display tube can be made to emit light at a low acceleration voltage. Thus, this invention is effective as a low-voltage drive phosphor display tube.

In the meanwhile, the FED is required to have a relatively low emission brightness (for example, on the order of 100–200 cd/m$^2$) as compared with the FIP and is therefore desired to be driven at a farther lower voltage. In this case, the effect of this invention such that the high brightness is achieved by reducing the oxide quantity is particularly great and useful.

(EXAMPLE 10)

A phosphor $La_2O_2S:Eu$ (average particle size of 2.0 μm, 5.0 mol % Eu being added to the matrix) was subjected to the nonreducing treatment. No acid etching was carried out. The other processes were carried out in the manner similar to Example 3 to obtain a red-emitting phosphor display apparatus. However, since the above-mentioned phosphor is readily subjected to hydrolysis and soluble in acid, similar oxide measurement can not be carried out. The brightness of the phosphor display tube was 857 cd/m$^2$.

When the phosphor film was baked in air (Comparative Example 2), the brightness is as low as 210 cd/m$^2$. The La-based phosphor prepared by the method of this invention achieved an improvement in brightness of 4.1 times.

(EXAMPLE 11)

In the manner similar to Example 3 except that a phosphor subjected to the nonreducing treatment was changed to $Y_2O_2S:Eu$ (average particle size of 2.0 μm, 2.5 mol % Eu being added to the matrix) and that the pH is adjusted by hydrochloric acid to 1.5, a red-emitting phosphor display apparatus was obtained. The brightness of the phosphor display tube was 700 cd/m$^2$.

When the similar phosphor film was baked in air (Reference Example 3), the brightness is 230 cd/m$^2$. The brightness of the phosphor display tube prepared by the conventional method as Comparative Example 3 has a brightness of 154 cd/m$^2$ while high brightness of 4.5 times was obtained in this invention. On the other hand, in case of baking in the oxidizing atmosphere, improvement in brightness was as small as 1.5 times.

(EXAMPLE 12)

In the manner similar to Example 11 except that the phosphor powder was baked in the reducing atmosphere at 900° C. for six hours with sulfur added at 40 mol % (15.2 g), a red-emitting phosphor display tube was obtained. The brightness of the phosphor display tube was equal to 1130 cd/m$^2$. As compared with the conventional phosphor display tube, high brightness of 7.3 times was achieved.

(EXAMPLE 13)

In the manner similar to Example 11 except that the phosphor powder was baked in the reducing atmosphere at 900° C. for six hours with sulfur added at 60 mol % (22.8 g), a red-emitting phosphor display tube was obtained. The brightness of the phosphor display tube was equal to 1038 cd/m$^2$. As compared with the conventional phosphor display tube, high brightness of 6.7 times was achieved.

Figure 5:
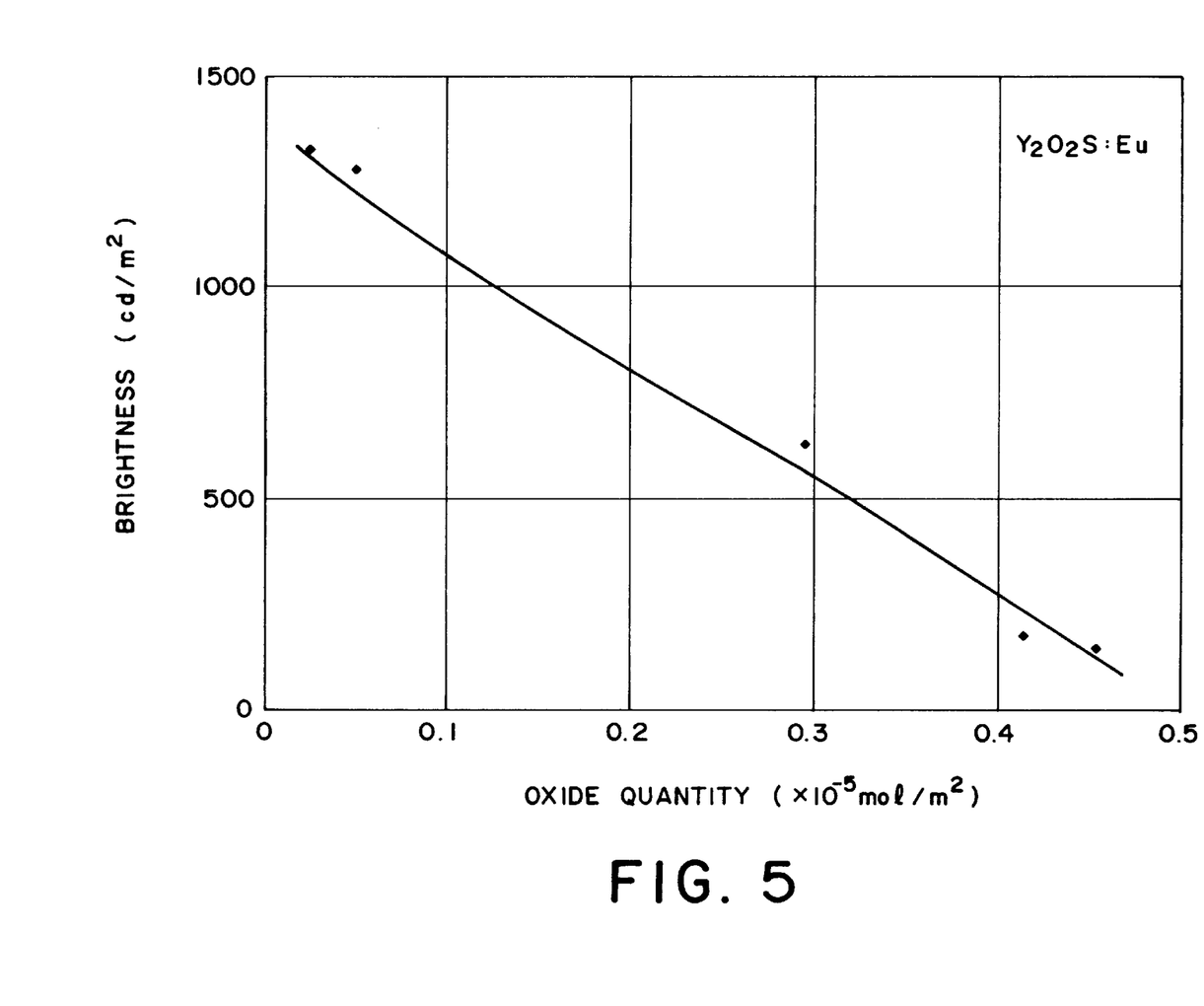
FIG. 5 is a graph which is for use in describing a low voltage electron beam excitation phosphor display apparatus according to this invention and which shows a relationship between an oxide quantity in a phosphor including an oxisulfide $Y_2O_2S:Eu$ and brightness of the low voltage electron beam excitation phosphor display apparatus including the phosphor.

As regards the phosphor $Y_2O_2S$, the relationship between the oxide quantity remaining in the phosphor and the brightness of the phosphor display tube is shown in FIG. 5. In $Y_2O_2S:Eu$, the smaller the oxide quantity is, the higher the brightness becomes, like in $Gd_2O_2S:Eu$. When the oxide quantity is equal to $0.05\times10^{-5}$ mol/m$^2$ or less, the phosphor display tube has a particularly high brightness and is extremely useful.

(EXAMPLE 14)

In the manner similar to Example 3 except that a phosphor subjected to the nonreducing treatment was changed to $Gd_2O_2S:Tb$ (average particle size of 2.0 µm, 2.5 mol % Tb being added to the matrix), a green-emitting phosphor display tube was obtained.

The brightness of the phosphor display apparatus was 1542 $cd/m^2$. For comparison, Comparative Example 4 was prepared by the conventional manufacturing method. Specifically, the phosphor is not subjected to acid etching or the reducing treatment. The phosphor film was baked in air at 500° C. The brightness of the phosphor display tube produced in the above-mentioned manner was 257 $cd/m^2$. Thus, high brightness of 5.6 times was obtained.

Besides those mentioned above, the following phosphors exhibited a high brightness effect similar to the foregoing examples.

$Gd_2O_2S:Eu,Tb$, $La_2O_2S:Eu,Tb$,
$Y_2O_2S:Eu,Tb$, $Gd_2O_2S:Eu,Sm$,
$La_2O_2S:Eu,Sm$, $Y_2O_2S:Eu,Sm$,
$La_2O_2S:Tb$, $Y_2O_2S;Tb$, $Gd_2O_2S:Pr$,
$La_2O_2S:Pr$, $Gd_2O_2S:Tb,Ce$,
$La_2O_2S:Tb,Ce$, $Y_2O_2S;Tb,Ce$,
$Gd_2O_2S:Tb,Dy$, $La_2O_2S:Tb,Dy$,
$Y_2O_2S:Tb,Dy$,
$Lu_2O_2S:Eu$, $Lu_2O_2S:Tb$, $Lu_2O_2S:Pr$,
$Lu_2O_2S:Tb,Ce$, $(Gd,La)_2O_2S:Eu$,
$(Gd,Y)_2O_2S:Tb$, $(Gd,La)_2O_2S:Tb,Dy$,
$(Y,Lu)_2O_2S:Pr$, $(Gd,La,Y)_2O_2S:Eu,Sm$

By changing the activating agent according to the prior art, this invention is similarly effective for the phosphors of the emission colors of red (activating agent: Eu), green (activating agent: Tb), and blue (activating agent: Tm).

In the etching treatment, use may be made of any other substance than hydrochloric acid and acetic acid as far as oxide in the phosphor is soluble. As the nonoxidizing atmosphere or the reducing atmosphere, use can be made of a sulfur atmosphere, an activated carbon atmosphere, a nitrogen gas atmosphere, a nitrogen gas atmosphere containing hydrogen gas, a hydrogen sulfide gas, and a combination thereof. Instead of acrylic resin, the autolytic type binder may be any macromolecule which is synthesized by polymerization and which can be transformed, when heated, into a low molecule to be volatilized, evaporated, or sublimated. For example, polyethylene oxide can be used without being restricted to acrylic resin.

As regards the heat treatment temperature of the phosphor in the reducing atmosphere, the reducing reaction does not progress at a low temperature. At a temperature of 300° C. or more, oxidation already occurs and the effect of suppression of oxidation of the phosphor is exhibited.

Addition of sulfur in the reducing atmosphere serves to provide the sulfur atmosphere by heating so as to enhance the reducing ability. The level of addition is appropriately selected in correspondence to the size of a vessel in which the phosphor is treated. Addition of 80 mol % or less with respect to the phosphor provides a sufficient reducing effect. Although no influence is given to the emission characteristics of the phosphor beyond the above-mentioned level, a less content is desired in economical and environmental aspects.

In the $Ln_2O_2S$-based phosphor, oxidation of the phosphor is observed when heated at 150° C. in air. Therefore, heating of the phosphor film at 150° C. or more must be carried out in a nonoxidizing atmosphere.

The nonoxidizing atmosphere may be the nitrogen gas, the argon gas, and a mixture of the nitrogen gas and the hydrogen gas.

It is practically difficult to make the oxygen concentration in the nonoxidizing atmosphere be completely equal to zero. The nonoxidizing atmosphere during the baking process of the phosphor $Ln_2O_2S:Eu$ had an allowable oxygen concentration of 0.1 vol %. Oxygen at a greater concentration is not applicable because oxidation of the phosphor is caused to occur so that the brightness is reduced. At the oxygen concentration of 0.1 vol % or less, no serious influence was given to the emission brightness of the phosphor display apparatus.

In this invention, the low voltage electron beam excitation display apparatus may be any type. For example, the type of the electron gun (hot electron emission type, cold cathode type) is not relied upon. Thus, various structures are possible.

The low voltage electron beam excitation phosphor display apparatus described in this invention uses the electron beam produced at the accelerating voltage of 500V or less. As will readily be understood, the effectiveness of this invention does not rely upon the method of emitting the electron beam. The known methods include a hot cathode method using the electron beam emitted from the heated cathode, a cold cathode method of forcibly extracting electrons from the cathode by a high electric field locally applied to a top end of the cathode site, and a combination thereof. This invention is effective with the low voltage electron beam produced by any one of the above-mentioned methods.

As described above, according to this invention, it is possible to provide a non-polluting high-brightness low voltage electron beam excitation phosphor display apparatus free from any harmful substance.

According to this invention, it is possible to dispense with the cost including plant investment, maintenance, and disposal which have traditionally been required in processing harmful substances. As a result, the production cost can be reduced.

In the prior art related to the low voltage electron beam excitation phosphor display tube, a plurality of kinds of the phosphors having different main components must be used in multi-color display (for example, (Zn,Cd)S for red-based color, ZnS for blue color, ZnO for green color. The main component is herein represented excluding a so-called activating agent added to obtain a desired emission color). On the other hand, this invention uses a single kind (for example, $Gd_2O_2S$) of main component with a rare-earth element corresponding to the desired emission color added as the activating agent. In this manner, multi-color display is possible. Use of the common main component provides multi-color display having an excellent brightness balance at a low cost.

In this invention, even if the phosphor is deteriorated and degraded in brightness after lighting for a long period of time such as several thousand hours, the respective emission colors exhibit degradation in brightness of a similar level because the main component is common. Therefore, the brightness balance among the respective emission colors is prevented from being disturbed. Thus, excellent color reproducibility is maintained for a long time. In particular, the effect is remarkable in the multi-color (including full-color) display apparatus utilizing the mixture of different emission colors.

What is claimed is:

1. A low voltage electron beam excitation phosphor display apparatus (10) comprising a vacuum chamber (1, 2, and 3), an anode (6) having a principal surface and enclosed in said vacuum chamber, a phosphor film (7) formed on said principal surface, and a cathode (9) enclosed in said vacuum chamber opposite to said phosphor film for emitting a low voltage electron beam towards said anode to excite said phosphor film to emit light, said phosphor film comprising a conductive material and a phosphor which consists essentially of an oxisulfide and an oxide inevitably formed on a surface of said phosphor on manufacturing said apparatus, said oxisulfide being represented by $Ln_2O_2S:R$, where Ln is at least one selected from a group consisting of Gd, La, Y, and Lu and where R is a rare-earth element, wherein a quantity of said oxide in said phosphor is at most $2.0 \times 10^{-5}$ mol/m$^2$.

2. A low voltage electron beam excitation phosphor display apparatus as claimed in claim 1, wherein said oxide is represented by $Ln_2O_3$ into which a component $Ln_2O_2S$ of said oxisulfide is changed.

3. A low voltage electron beam excitation phosphor display apparatus as claimed in claim 1, wherein the quantity of said oxide in said phosphor is at most $1.5 \times 10^{-5}$ mol/m$^2$ when said oxisulfide is represented by $Gd_2O_2S:R$.

4. A low voltage electron beam excitation phosphor display apparatus as claimed in claim 1, wherein the quantity of said oxide in said phosphor is at most $0.05 \times 10^{-5}$ mol/m$^2$ when said oxisulfide is represented by $Y_2O_2S:R$.

5. A method of manufacturing a low voltage electron beam excitation phosphor display apparatus (10) comprising a vacuum chamber (1, 2, and 3), an anode (6) having a principal surface and enclosed in said vacuum chamber, a phosphor film (7) formed on said principal surface, and a cathode (9) enclosed in said vacuum chamber opposite to said phosphor film for emitting a low voltage electron beam towards said anode to excite said phosphor film to emit light, said method including an anode-forming step of forming said anode on an insulating substrate (1) constituting said vacuum chamber, wherein said method comprises:

a preparing step of preparing a phosphor which consists essentially of an oxisulfide and an oxide inevitably formed on a surface of said phosphor on preparing said phosphor, said oxisulfide being represented by $Ln_2O_2S:R$, where Ln is at least one selected from a group consisting of Gd, La, Y, and Lu and where R is a rare-earth element;

a removing step of removing said oxide from said phosphor to produce an oxide-removed phosphor;

a coating step of coating, on the principal surface of said anode, a paste comprising a mixture of said oxide-removed phosphor, a conductive material, and an autolytic type binder;

a binder-heating step of heating the binder of said paste in a nonoxidizing atmosphere to form, on the principal surface of said anode, said phosphor film comprising said oxide-removed phosphor and said conductive material; and an enclosing step of enclosing said anode and said cathode in said vacuum chamber to obtain a manufactured low voltage electron beam excitation phosphor display apparatus.

6. A method as claimed in claim 5, wherein said oxide is represented by $Ln_2O_3$ into which a component $Ln_2O_2S$ of said oxisulfide is changed.

7. A method as claimed in claim 5, wherein said autolytic binder is at least one selected from a group consisting of polyethylene oxide and acrylic resin.

8. A method as claimed in claim 5, wherein said removing step comprises an etching step of etching said oxide by the use of acid to produce said oxide-removed phosphor.

9. A method as claimed in claim 5, wherein said removing step comprises a phosphor-heating step of heating said phosphor in a nonoxidizing atmosphere to remove said oxide from said phosphor to thereby produce said oxide-removed phosphor.

10. A method as claimed in claim 9, wherein the nonoxidizing atmosphere in said phosphor-heating step is selected from a reducing atmosphere of carbon, a reducing atmosphere of a mixture of hydrogen and an inert gas, and a neutral atmosphere of nitrogen.

11. A method as claimed in claim 5, wherein said removing step comprises:

an etching step of etching said oxide by the use of acid; and a phosphor-heating step of heating said phosphor in a nonoxidizing atmosphere to produce said oxide-removed phosphor.

12. A method as claimed in claim 11, wherein the nonoxidizing atmosphere in said phosphor-heating step is selected from a reducing atmosphere of carbon, a reducing atmosphere of a mixture of hydrogen and an inert gas, and a neutral atmosphere of nitrogen.

13. A method as claimed in claim 5, wherein said removing step comprises a heating step of heating, in a reducing atmosphere with any one of sulfur and sulfur-compound mixed to said phosphor at a mixing ratio of 0–80 mol % (0 exclusive and 80 inclusive) with respect to said phosphor, said phosphor to remove said oxide from said phosphor to thereby produce said oxide-removed phosphor.

14. A method as claimed in claim 5, wherein a quantity of a resultant oxide is at most $2.0 \times 10^{-5}$ mol/m$^2$ in the phosphor of said phosphor film of said manufactured low voltage electron beam excitation phosphor display apparatus.

15. A method as claimed in claim 14, wherein the quantity of said resultant oxide is at most $1.5 \times 10^{-5}$ mol/m$^2$ in the phosphor of said phosphor film of said manufactured low voltage electron beam excitation phosphor display apparatus when said oxisulfide is represented by $Gd_2O_2S:R$.

16. A method as claimed in claim 14, wherein the quantity of said resultant oxide is at most $0.05 \times 10^{-5}$ mol/m$^2$ in the phosphor of said phosphor film of said manufactured low voltage electron beam excitation phosphor display apparatus when said oxisulfide is represented by $Y_2O_2S:R$.

* * * * *